(12) United States Patent
Tamma (10) Patent No.: US 7,210,137 B1
(45) Date of Patent: Apr. 24, 2007

(54) MEMORY MAPPING AND PARSING APPLICATION DATA

(75) Inventor: Leela S. Tamma, Fremont, CA (US)

(73) Assignee: Microsoft Corporation, Redmond, WA (US)

(*) Notice: Subject to any disclaimer, the term of this patent is extended or adjusted under 35 U.S.C. 154(b) by 693 days.

(21) Appl. No.: 10/436,518

(22) Filed: May 13, 2003

(51) Int. Cl.
*G06F 9/45* (2006.01)
*G06F 9/44* (2006.01)

(52) U.S. Cl. .................. 717/143; 717/148; 717/165

(58) Field of Classification Search ............... 717/114, 717/115, 118, 141–148, 162–166
See application file for complete search history.

(56) References Cited

U.S. PATENT DOCUMENTS

| | | | |
|---|---|---|---|
| 6,446,110 B1 | 9/2002 | Lection et al. | |
| 6,446,256 B1* | 9/2002 | Hyman et al. | 717/143 |
| 6,505,342 B1* | 1/2003 | Hartmann et al. | 717/104 |
| 6,594,823 B1* | 7/2003 | Corbin et al. | 717/143 |
| 6,687,897 B1* | 2/2004 | Guinart | 717/143 |
| 6,763,499 B1* | 7/2004 | Friedman et al. | 715/513 |
| 6,772,413 B1* | 8/2004 | Kuznetsov | 717/136 |
| 6,859,920 B1* | 2/2005 | Finocchio | 717/108 |
| 6,874,141 B1* | 3/2005 | Swamy et al. | 717/144 |
| 6,918,107 B1* | 7/2005 | Lucas et al. | 717/124 |
| 6,990,513 B1* | 1/2006 | Belfiore et al. | 709/203 |
| 7,007,230 B1* | 2/2006 | Friedman et al. | 715/513 |
| 7,058,939 B1* | 6/2006 | Berg et al. | 717/165 |
| 7,089,543 B1* | 8/2006 | Rising, III | 717/144 |
| 7,111,286 B1* | 9/2006 | Schrader et al. | 717/143 |
| 7,127,713 B1* | 10/2006 | Davis et al. | 717/177 |

OTHER PUBLICATIONS

Wong, "The extended XQL for querying and updating large XML database", ACM DocEng, pp. 95-104, 2001.*
Meng et al, "Schema guided wrapper maintenance for web data extraction", ACM WIDM, pp. 1-8, 2003.*
Takase et al, "An adaptive fasy and safe XML parser based on byte sequences memorization", ACM WWW, pp. 692-701, 2005.*
Kostoulas et al, "XML screamer an integrated approch to high performance XML parsing, validation and deserilization", ACM WWW, pp. 93-102, 2006.*

* cited by examiner

*Primary Examiner*—Anil Khatri
(74) *Attorney, Agent, or Firm*—Lee & Hayes, PLLC (57) ABSTRACT

In an implementation of application data processing, an application data file is received and memory mapped. A data parser then parses and validates the memory mapped application data.

46 Claims, 6 Drawing Sheets

MEMORY MAPPING AND PARSING APPLICATION DATA

TECHNICAL FIELD

This invention relates to application data processing and, in particular, to memory mapping and parsing application data.

BACKGROUND

The binary code for application programs is typically memory mapped by a memory manager of an operating system to use the actual contents of the binary image as the program's reserved region of address space. This allows a computing system to transfer an application for execution from disk storage to RAM at a page size that is defined and implemented by the memory manager which is optimized to perform I/O operations as fast as possible. Further, the size of the paging file is not oversized (e.g., the file on disk storage containing the virtual memory that is available to all of the processes running in the system remains small).

Extensible Markup Language (XML) is a flexible way to create a common information format and share both the format and data with any individual or group that wants to communicate and receive information in a consistent way. XML describes a standard for how to create a document structure and contains markup symbols to describe the contents of a page or file of application data. XML is "extensible" because the markup symbols of a document structure are unlimited and self-defining. An XML data file can be processed as data by a program, stored with similar data on another computer, or displayed.

During processing, an XML data file can be parsed into components of the data which can be validated as accurate and conforming to a particular XML specification, such as a schema definition for a particular application. An XML parser is typically an application program implemented to receive an input of XML data and break up the data into component parts that can then be processed and/or managed by other programming modules.

Two programming interfaces commonly implemented to parse XML data are the Document Object Model (DOM) and the Simple API for XML (SAX) interfaces which are widely used and incorporated into programming applications. DOM is a programming interface specification that defines a standard set of commands that an XML parser can utilize to access XML document content from a file. A DOM-based XML parser parses the XML data file into individual objects, such as the elements, attributes, and comments, and creates a representative binary tree structure of the document in memory so that each object is easily accessible and can be individually referenced and manipulated. Creating a tree structure for a large XML document, however, requires a significant amount of memory. For a large XML data file (e.g., 500 Mbytes and more), system performance may be degraded if there is not enough memory available to process the XML data file.

SAX is an application program interface (API) that can be utilized to parse an XML data file that describes a collection of data. SAX is a simpler interface and is an alternative to using DOM to interpret an XML file, but has fewer capabilities for manipulating the data content of an XML file. SAX is stream and event based, and generates events when encountering specific components in an XML document. SAX performs a forward only scan on a file to locate and handle an event associated with the data. As the parser evaluates the data, it communicates any elements or tags to the programming application that is interfacing with the parser.

An advantage of SAX over DOM is that it processes documents serially to read a section of an XML document, generate an event, and then continues on to read the next section. This form of serial document processing uses less memory than DOM. However, SAX does not validate the XML data against a schema as it parses the data. Further, SAX has to generate file reads (e.g., I/O commands) to read an XML document file which is then stored into a cache memory. This requires significantly more processing time to perform the I/O access reads. Because SAX is a forward only parser, it also does not provide random access to a document that is not loaded into memory. Rather, the data is handled in the order in which it is processed.

Each of the DOM and SAX-based XML parsers have drawbacks to their respective operation that render them inefficient to parse large XML data files. DOM provides faster access to the data, but for large XML data files, DOM takes up too much memory for the binary tree structure that represents the XML data file. SAX does not take up the memory space, but also does not provide quick access to the XML data in a file. SAX also does not validate the XML data when parsing an XML data file.

Accordingly, there is a need for application data processing that does not take up available system memory, allows for quick access to data in a data file, and provides that structured data, such as XML data, can be validated while being read from disk memory storage.

SUMMARY

Application data processing is described herein.

In an implementation, an application data file is received and memory mapped. A data parser then parses and validates the memory mapped application data.

BRIEF DESCRIPTION OF THE DRAWINGS

The same numbers are used throughout the drawings to reference like features and components.

DETAILED DESCRIPTION

Application data processing systems and methods are described that utilize only limited system memory when processing an application data file, allow for quick access to the data in the file, and provide that the application data can be validated while being read from disk memory, for example, into the system memory. An application data processing system can receive and memory map an application data file, and an application data processing component can then process and/or further manage the memory mapped data. In an implementation of application data processing, an Extensible Markup Language (XML) data processing system receives and memory maps an XML data file. An XML parser can then parse and validate memory mapped XML data. In another example, a spatial data processing system receives spatial data, such as satellite image data for a geographic mapping application, and memory maps the spatial data.

The following discussion is directed to application data processing and parsing systems and methods. While features of the described systems and methods can be implemented in any number of different application data systems, they are described in the context of the following exemplary system architectures.

Figure 1:
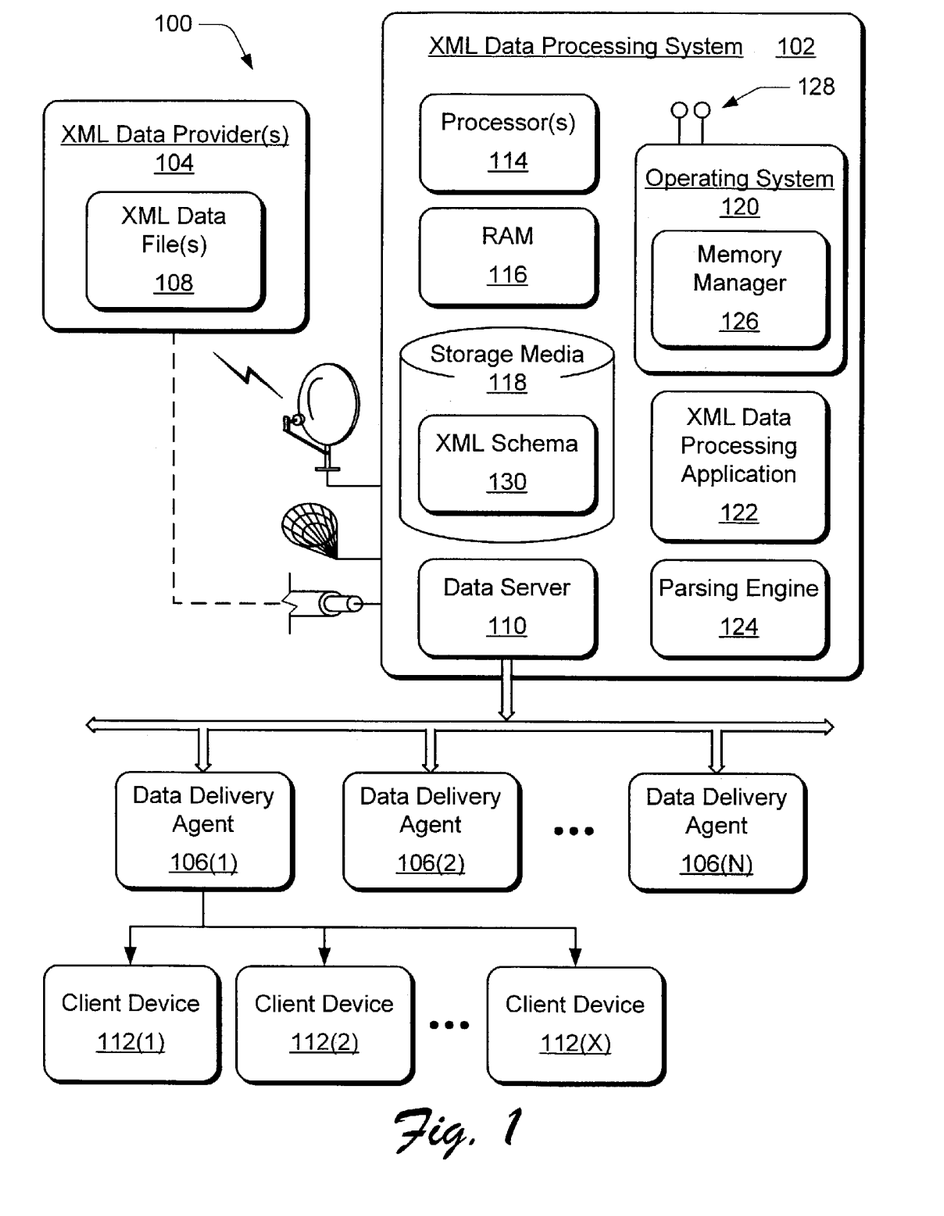
FIG. 1 illustrates various components of an exemplary data delivery system in which application data processing can be implemented.

FIG. 1 illustrates various components of an exemplary data delivery system 100 which includes an XML data processing system 102, one or more XML data providers 104, and data delivery agents 106(1), 106(2), . . . 106(N). The XML data processing system 102 is an exemplary implementation of an application data processing system that receives and processes application data that is structured, defined, or similarly characterized for processing by a particular application. By way of example, the data delivery system 100 can be implemented as a high-volume, reliable email delivery system in which an XML data provider 104, such as a large national and/or international corporation, can distribute an email message to a large number of recipients at one time, such as to all persons having a business relationship with the corporation.

The XML data provider 104 generates one or more XML data files 108 that are communicated to the XML data processing system 102. For example, an XML data file 108 can include the content of the message intended for distribution to the large number of email recipients, and can include each recipient's email identification and information (e.g., name, email address, and the like). The size of such an XML data file 108 is primarily due to the number of recipients and the email identification and information for each recipient to whom the single message is to be delivered.

In this example, the XML data processing system 102 receives the XML data file 108 of XML data that includes the content of the email message and the recipients' email identification and information. The XML data processing system 102 then processes the XML data to generate each of the individual email messages which are communicated by a data server 110 to the data delivery agents 106(1), 106(2), . . . 106(N) for dispersal to any number of client devices 112(1), 112(2), . . . . 112(X) (e.g., the intended recipients of the email message). Although only data delivery agent 106(1) is shown to be communicatively linked with the client devices 112(1), 112(2), . . . . 112(X), each of the delivery agents 106(2), . . . 106(N) can be implemented to communicate data to any number of client devices 112.

The XML data processing system 102 includes one or more processors 114 (e.g., any of microprocessors, controllers, and the like) which process instructions to control the operation of various components of the XML data processing system 102. The system 102 can be implemented with one or more memory components, examples of which include a random access memory (RAM) 116 and any form of storage media 118. Although not shown in this example, the XML data processing system 102 may be implemented with any number and combination of differing components as further described below with reference to the exemplary computing systems, devices, and components shown in FIG. 6.

The XML data processing system 102 also includes application programs such as an operating system 120, an XML data processing application 122, and a parsing engine 124. The operating system 120, XML data processing application 122, and the parsing engine 124 can be stored as computer executable instructions 11 in a non-volatile memory and executed on processor(s) 114. The XML data processing application 122 communicates with a memory manager 126 of the operating system 120 via exposed application program interfaces (APIs) 128 to process the XML data as further described with reference to FIGS. 2 and 3. The parsing engine 124 parses the XML data and utilizes an XML schema 130 maintained with the storage media 118 to validate the XML data as further described with reference to FIGS. 4 and 5.

Although the XML data processing application 122 and the parsing engine 124 are each illustrated and described as single application programs, each of the application programs 122 and 124 can be implemented as several component applications distributed to each perform one or more functions in an XML data processing system. Further, although the XML data processing application 122 and the parsing engine 124 are illustrated and described as separate application programs, the XML data processing application 122 and the parsing engine 124 can be implemented together as a single application program.

Figure 2:
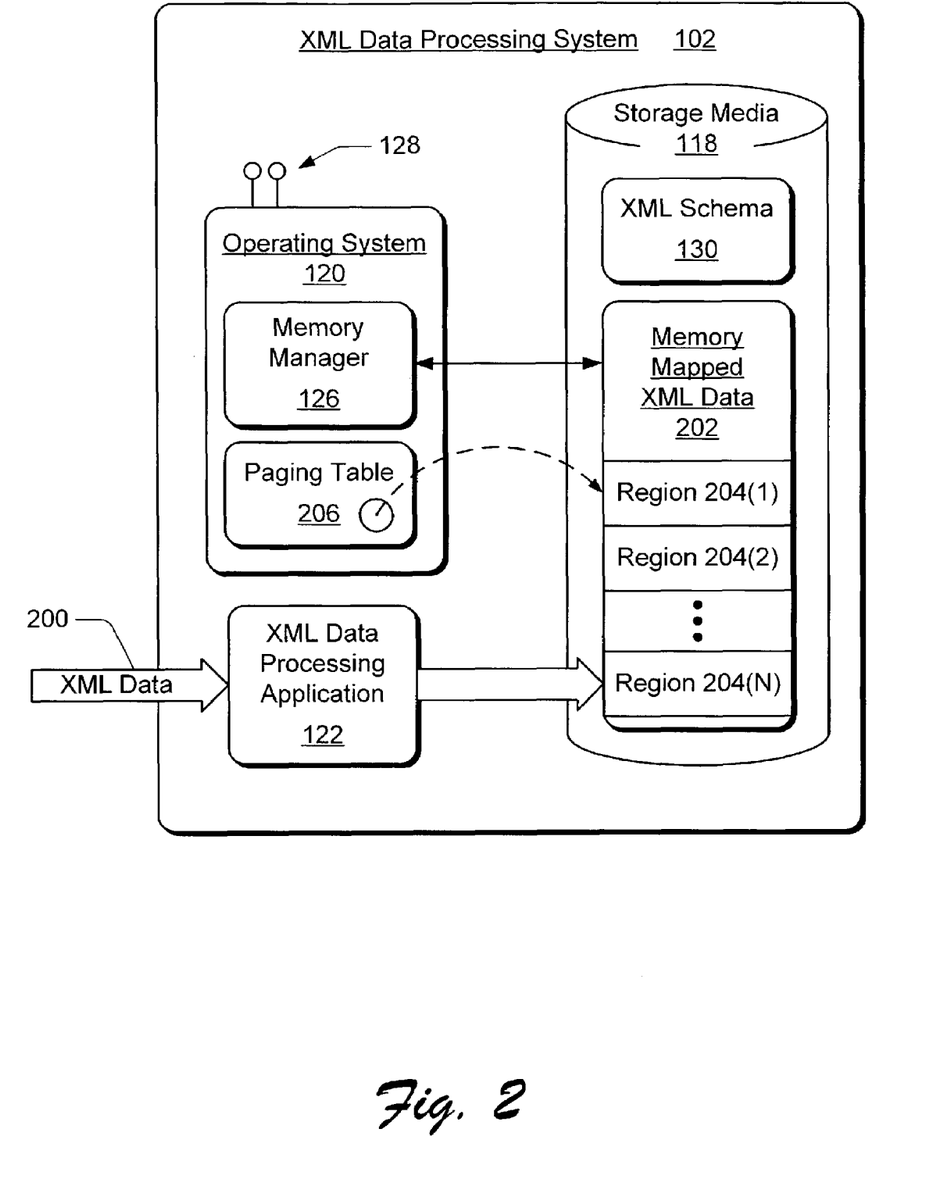
FIG. 2 further illustrates components of the application data processing system shown in FIG. 1.

FIG. 2 further illustrates the XML data processing system 102 shown in FIG. 1. The XML data processing application 122 receives XML data 200 and communicates with the memory manager 126 via the operating system APIs 128 to initiate memory mapping of the XML data. The memory manager 126 memory maps the XML data 200 to generate the memory mapped XML data 202 as mapped regions 204(1), 204(2), . . . 204(N) maintained with storage media 118.

The memory manager 126 also generates a paging table 206 of references (e.g., pointers) that each reference a mapped region 204 of the memory mapped XML data 202. The size of a mapped region 204 of XML data can be as large as the maximum page size that the underlying operating system 120 can support. Further, this provides that large XML data files can be parsed without loading the complete XML data into memory (e.g., RAM 116) by taking advantage of the operating system memory mapping feature which allows an XML data file to be represented as a physical storage for a region of address space.

Memory mapping simplifies application data file (e.g., XML data file) access by eliminating the need for system-maintained pointers for read and write operations. The speed at which application data and application instructions are processed in a system is proportionate to the number of access operations required to obtain data that is not maintained with program-addressable memory. Memory mapped XML data files provide a mechanism for the XML data processing application 122 and/or the parsing engine 124 (FIG. 1) to access the file data by directly incorporating the file data into process address space. The use of mapped application data files reduces I/O data commands because the application data does not have to be copied into process data buffers, as is done by conventional read and write subroutines.

Methods for application data processing shown below in FIGS. 3 and 5 may be described in the general context of computer-executable instructions. Generally, computer-executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer-executable instructions may be located in both local and remote computer storage media, including memory storage devices.

Figure 3:
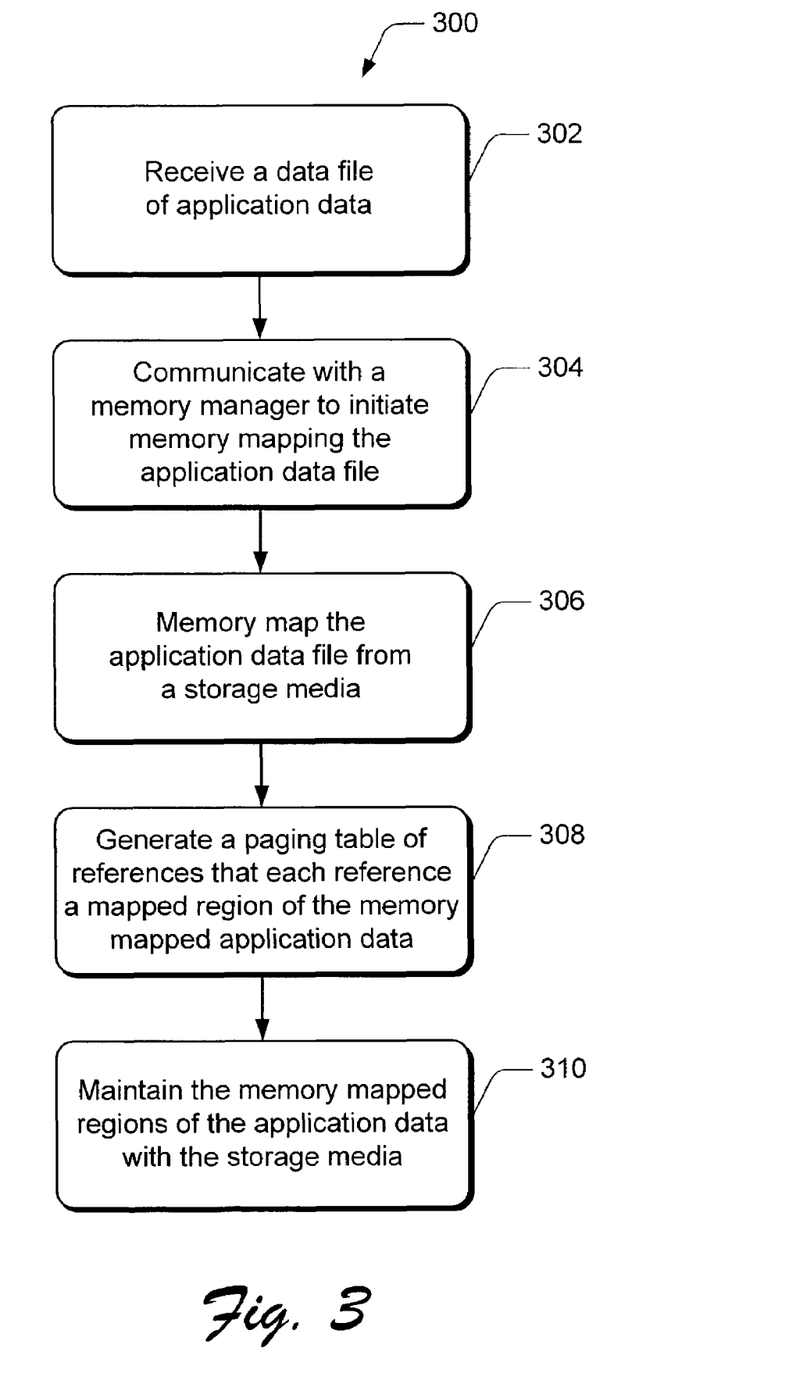
FIG. 3 is a flow diagram that illustrates an exemplary method for memory mapping application data.

FIG. 3 illustrates a method 300 for memory mapping application data. The order in which the method is described is not intended to be construed as a limitation, and any number of the described method blocks can be combined in any order to implement the method. Furthermore, the method can be implemented in any suitable hardware, software, firmware, or combination thereof.

At block 302, a data file of application data is received. At block 304, a memory manager is communicated with to initiate memory mapping the application data file. For example, the XML data processing application 122 communicates with memory manager 126 via the operating system APIs 128 to initiate memory mapping the XML data 200 when it is received (FIG. 2).

At block 306, the application data file is memory mapped from a storage media. For example, the memory manager 126 memory maps the received XML data 200 to generate the memory mapped XML data 202 maintained with storage media 118 (FIG. 2). At block 308, a paging table of references is generated where each reference is a pointer to a mapped region of the memory mapped application data. For example, the memory manager generates paging table 206 of references (e.g., pointers) that each reference a region 204 of the memory mapped XML data 202 (FIG. 2). At block 310, the memory mapped regions of the application data are maintained with the storage media.

Figure 4:
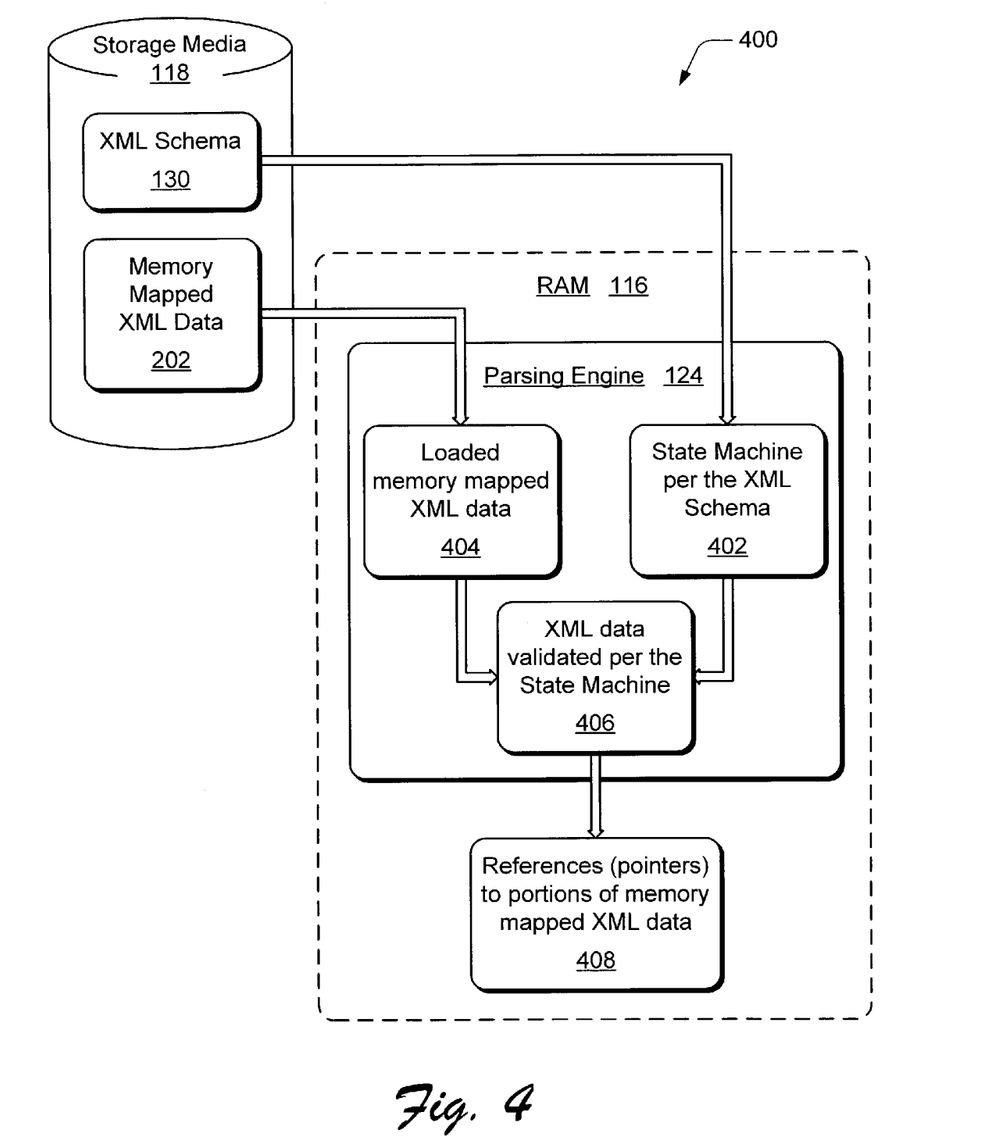
FIG. 4 illustrates various components of an exemplary XML data parsing system.

FIG. 4 illustrates various components of an exemplary XML data parsing system 400 which includes the storage media 118 and an instantiation of the parsing engine 124 as an executable in RAM 116. The parsing engine 124 loads the XML schema 130 from the storage media 118 and builds a state machine 402 corresponding to the XML schema. Further, the parsing engine 124 loads the memory mapped XML data 202 from the storage media 118 into RAM 116 as loaded memory mapped XML data 404.

The parsing engine 124 also parses and validates 406 the XML data 404 according to the state machine 402 to validate that the XML data is both well-formed according to established XML conventions and is defined according to the XML schema definition 130. The parsing engine 124 generates a reference 408 (e.g., a pointer) to a validated portion of the memory mapped XML data 202 which allows an application program to access and further process the XML data.

The parsing engine 124 handles the XML data 404 to be parsed as a memory mapped file and handles the actual XML data file 202 as a paging file. An advantage of this technique is that all of the I/O interaction occurs in RAM 116 in the form of standard memory addressing, and the parsing engine 124 performs all data transfers from the storage media 118 to RAM 116 at the page size defined and used by the memory manager 126 which is optimized to perform all disk I/O as fast as possible.

The parsing engine 124 is a forward only, read-only cursor which provides fast access to the input stream of loaded memory mapped XML data 404. The forward only aspect of the parsing engine 124 provides that the XML data 404 only needs to be read once (e.g., the data regions of memory mapped XML data 202 are loaded into RAM memory 116 only once during the course of parsing).

Further, because the mapped regions of loaded XML data 404 are backed by the memory mapped XML data 202, the parsing engine 124 is sheltered from buffering the XML data.

Figure 5:
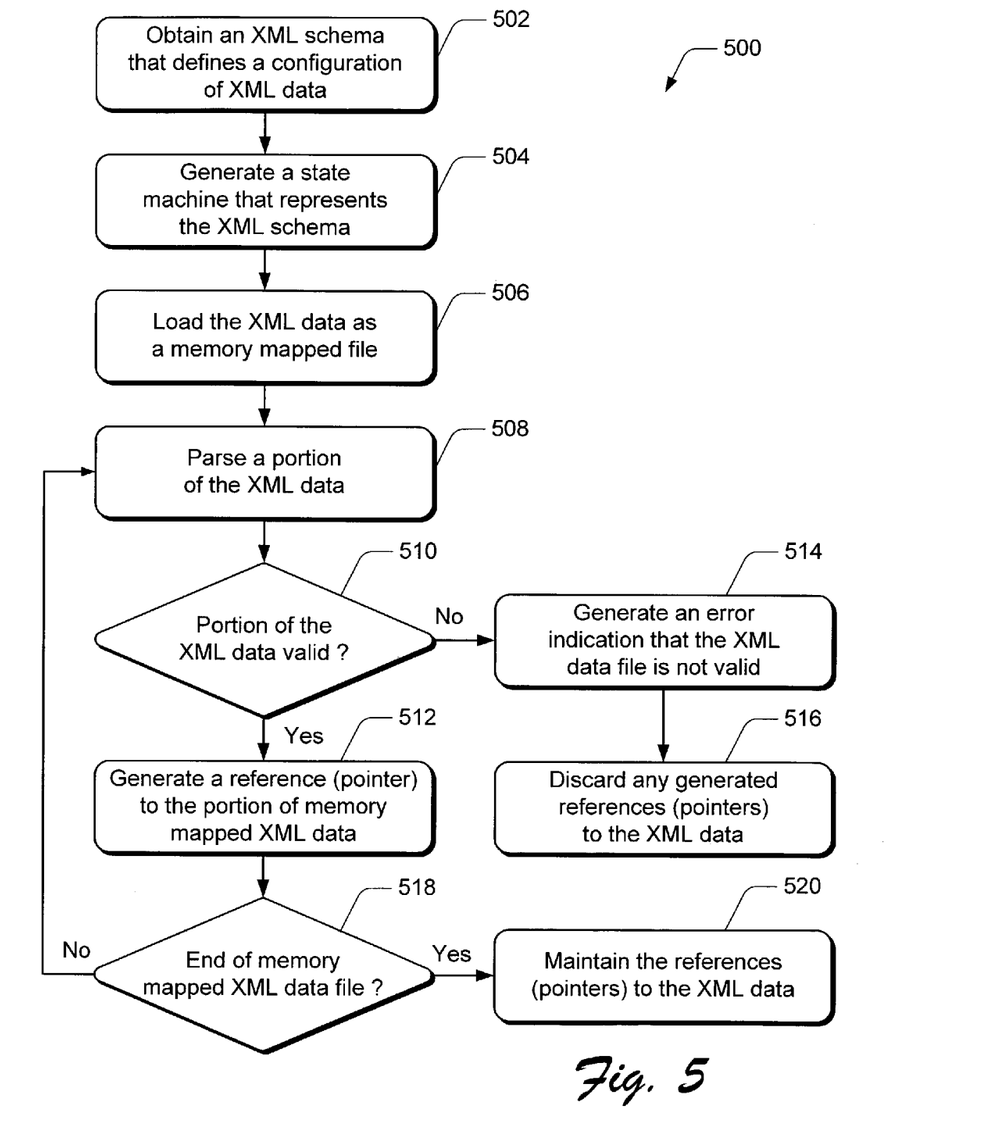
FIG. 5 is a flow diagram that illustrates an exemplary method for parsing memory mapped XML data.

FIG. 5 illustrates a method 500 for parsing memory mapped XML data. The to order in which the method is described is not intended to be construed as a limitation, and any number of the described method blocks can be combined in any order to implement the method. Furthermore, the method can be implemented in any suitable hardware, software, firmware, or combination thereof.

At block 502, an XML schema is obtained that defines a configuration of the XML data. For example, parsing engine 124 obtains XML schema 130 from storage media 118 (FIG. 4). At block 504, a state machine is generated that represents the XML schema. For example, parsing engine 124 builds, or otherwise generates, state machine 402 according to the XML schema 130.

At block 506, the XML data is loaded as a memory mapped file. For example, parsing engine 124 loads the memory mapped XML data 202 from the storage media 118 into RAM 116 as loaded memory mapped XML data 404 (FIG. 4). At block 508, a portion of the loaded XML data is parsed. For example, parsing engine 124 parses a portion of the loaded memory mapped XML data 404.

At block 510, a determination is made as to whether the parsed portion of the XML data is valid. For example, parsing engine 124 validates the loaded memory mapped XML data 404 according to the state machine 402 that represents the XML schema 130 which defines a configuration of the memory mapped XML data. If the parsed portion of the XML data is valid (i.e., "yes" from block 510), then a reference (e.g., a pointer) is generated to the portion of memory mapped XML data at block 512. For example, parsing engine 124 generates reference(s) 408 to valid portion(s) of the memory mapped XML data 202.

If the parsed portion of the XML data is not valid (i.e., "no" from block 510), then an error indication is generated to indicate that the XML data file is not valid at block 514. Further, at block 516, any references (e.g., pointers) previously generated are discarded because the XML data file is not valid. At block 518, a determination is made as to whether the method has reached an end of the memory mapped XML data file. If an end of the data file has not been reached (i.e., "no" from block 518), then the method 500 continues at block 508 to parse a next portion of the XML data. If an end of the data file has been reached (i.e., "yes" from block 518), then, at block 520, the references generated at block 512 are maintained in memory.

Figure 6:
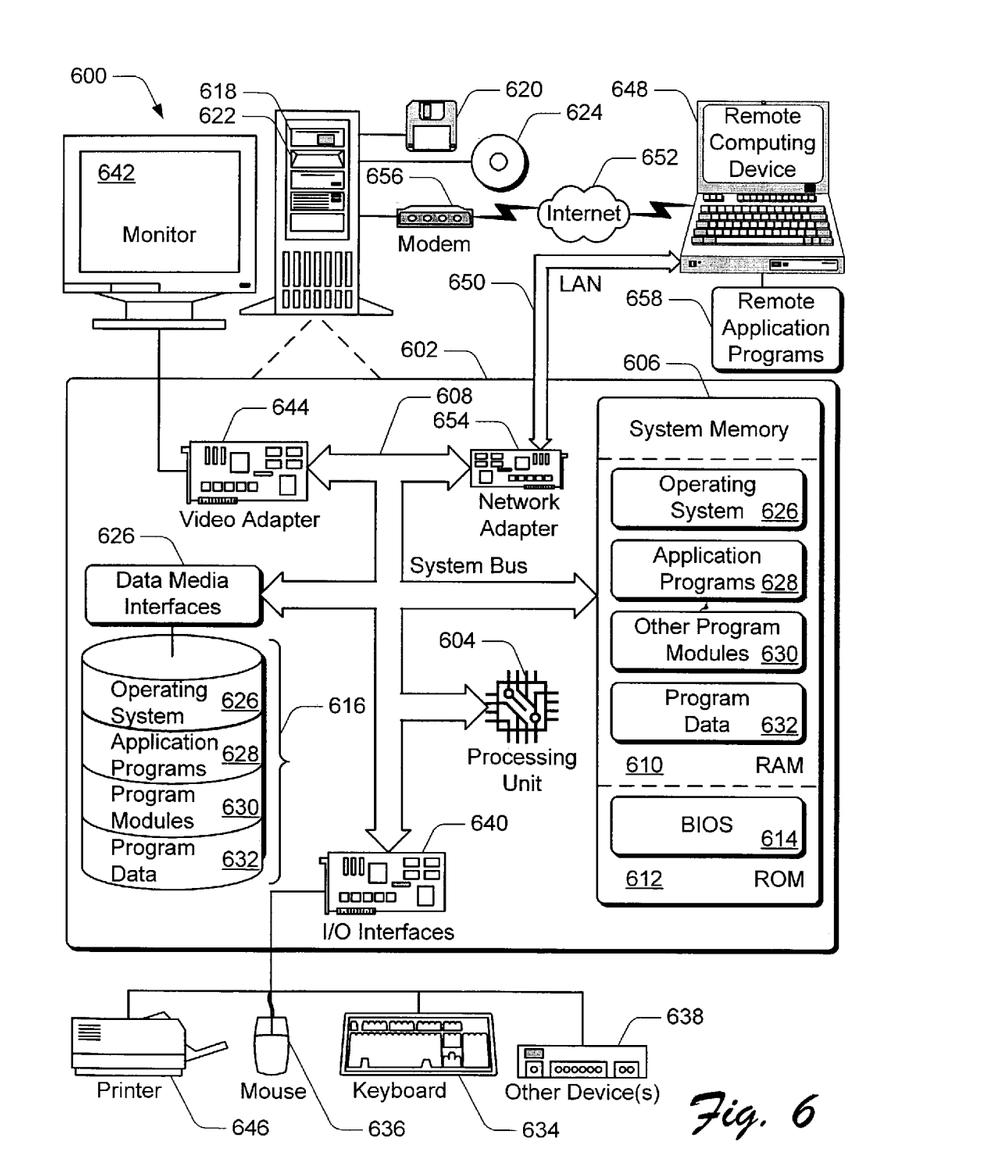
FIG. 6 illustrates a diagram of exemplary computing systems, devices, and components in an environment that application data processing can be implemented.

FIG. 6 illustrates an example of a computing environment 600 within which the application data processing systems and methods, as well as the computer, network, and system architectures described herein, can be either fully or partially implemented. Exemplary computing environment 600 is only one example of a computing system and is not intended to suggest any limitation as to the scope of use or functionality of the network architectures. Neither should the computing environment 600 be interpreted as having any dependency or requirement relating to any one or combination of components illustrated in the exemplary computing environment 600.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, by are not limited to, one or more processors 604 (e.g., any of microprocessors, controllers, and the like), a system memory 606, and a system bus 608 that couples various system components including the processor 604 to the system memory 606. The one or more processors 604 process various computer-executable instructions to control the operation of computing device 602 and to communicate with other electronic and computing devices.

The system bus 608 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 600 typically includes a variety of computer-readable media. Such media can be any available media that is accessible by computing device 602 and includes both volatile and non-volatile media, removable and non-removable media. The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computing device 602, such as during start-up, is stored in ROM 612. RAM 610 typically contains data and/or program modules that are immediately accessible to and/or presently operated on by the processing unit 604.

Computing device 602 can also include other removable/non-removable, volatile/non-volatile computer storage media. By way of example, a hard disk drive 616 is included for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD, or any other type of optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by a SCSI interface (not shown).

The disk drives and their associated computer-readable media provide non-volatile storage of computer-readable instructions, data structures, program modules, and other data for computing device 602. Although the example illustrates a hard disk 616, a removable magnetic disk 620, and a removable optical disk 624, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of the systems and methods for a test instantiation system.

Computing device 602 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 602 via input devices such as a keyboard 634 and a pointing device 636 (e.g., a "mouse"). Other input devices 638 (not shown specifically) may include a microphone, joystick, game pad, controller, satellite dish, serial port, scanner, and/or the like. These and other input devices are connected to the processing unit 604 via input/output interfaces 640 that are coupled to the system bus 608, but may be connected by other interface and bus structures, such as a parallel port, game port, and/or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computing device 602 via the input/output interfaces 640.

Computing device 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computing device 602.

Logical connections between computing device 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computing device 602 is connected to a local network 650 via a network interface or adapter 654.

When implemented in a WAN networking environment, the computing device 602 typically includes a modem 656 or other means for establishing communications over the wide network 652. The modem 656, which can be internal or external to computing device 602, can be connected to the system bus 608 via the input/output interfaces 640 or other appropriate mechanisms. It is to be appreciated that the illustrated network connections are exemplary and that other means of establishing communication link(s) between the computing devices 602 and 648 can be employed.

In a networked environment, such as that illustrated with computing environment 600, program modules depicted relative to the computing device 602, or portions thereof, may be stored in a remote memory storage device. By way of example, remote application programs 658 reside on a memory device of remote computing device 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

Although embodiments of the invention have been described in language specific to structural features and/or methods, it is to be understood that the invention defined in the appended claims is not necessarily limited to the specific features or methods described. Rather, the specific features and methods are disclosed as exemplary implementations of the claimed invention.

The invention claimed is:

1. An application data processing system, comprising:
   a storage media configured to maintain memory mapped regions of XML data, and maintain an XML schema defining a configuration of the XML data;
   a memory manager configured to memory map the XML data in the storage media;
   a data processing application configured to:
      receive an application data file that includes the XML data;
      communicate with the memory manager to initiate memory mapping the XML data;
   a parsing engine configured to:
      generate a state machine that represents the XML schema;
      load the XML data as a memory mapped file; and
      validate the XML data according to the state machine that represents the XML schema which defines the configuration of the XML data.

2. An application data processing system as recited in claim 1, wherein the memory manager is further configured to generate a paging table of references each configured to reference a mapped region of the memory mapped XML data.

3. An application data processing system as recited in claim 1, wherein the parsing engine is further configured to:
   parse a portion of the XML data; and
   validate the portion of the XML data according to the state machine that represents the XML schema which defines the configuration of the XML data.

4. An application data processing system as recited in claim 3, wherein the parsing engine is further configured to generate a reference to the portion of the XML data.

5. An XML parsing system, comprising:
   a storage media configured to maintain an XML schema defining a configuration of memory mapped XML data;
   a parsing engine configured to:
      parse the memory mapped XML data; and
      validate the memory mapped XML data according to the XML schema.

6. An XML parsing system as recited in claim 5, wherein the parsing engine is further configured to:
   generate a state machine that represents the XML schema; and
   validate the memory mapped XML data according to the state machine.

7. An XML parsing system as recited in claim 5, wherein the parsing engine is further configured to:
   obtain the XML schema from the storage media;
   generate a state machine that represents the XML schema; and
   validate the memory mapped XML data according to the state machine.

8. An XML parsing system as recited in claim 5, wherein the parsing engine is further configured to:
   parse a portion of the memory mapped XML data; and
   validate the portion of the memory mapped XML data according to a state machine that represents the XML schema which defines the configuration of the memory mapped XML data.

9. An XML parsing system as recited in claim 5, wherein the parsing engine is further configured to:
   validate a portion of the memory mapped XML data according to a state machine that represents the XML schema which defines the configuration of the memory mapped XML data; and
   generate a reference to the portion of the XML data.

10. A method, comprising:
    receiving an application data file of application data;
    memory mapping the application data file; and
    maintaining memory mapped regions of the application data;
    generating a state machine that represents a schema defining a configuration of the application data;
    validating the application data according to the state machine.

11. A method as recited in claim 10, further comprising generating a paging table of references each referencing a mapped region of the memory mapped application data.

12. A method as recited in claim 10, further comprising communicating with a memory manager to initiate the memory mapping of the application data file.

13. A method as recited in claim 10, further comprising communicating with a memory manager via one or more operating system application programming interfaces to initiate the memory mapping of the application data file.

14. One or more computer-readable storage media comprising computer-executable instructions that, when executed, direct a computing device to perform the method of claim 10.

15. A method, comprising:
    receiving an XML data file of XML data;
    memory mapping the XML data file;
    maintaining memory mapped regions of the XML data; and
    validating the XML data.

16. A method as recited in claim 15, further comprising:
    obtaining an XML schema that defines a configuration of the XML data; and
    generating a state machine that represents the XML schema.

17. A method as recited in claim 15, further comprising:
    loading the XML data as a memory mapped file; and validating the XML data according to a state machine that represents an XML schema which defines a configuration of the XML data.

18. A method as recited in claim 15, further comprising:
loading the XML data as a memory mapped file;
parsing a portion of the XML data; and
validating the portion of the XML data according to a state machine that represents an XML schema which defines a configuration of the XML data.

19. A method as recited in claim 15, further comprising:
loading the XML data as a memory mapped file;
parsing a portion of the XML data;
validating the portion of the XML data according to a state machine that represents an XML schema which defines a configuration of the XML data; and
generating a reference to the portion of the XML data.

20. A method as recited in claim 15, further comprising:
obtaining an XML schema that defines a configuration of the XML data;
generating a state machine that represents the XML schema;
loading the XML data as a memory mapped file; and
validating the XML data according to the state machine.

21. A method as recited in claim 15, further comprising:
obtaining an XML schema that defines a configuration of the XML data;
generating a state machine that represents the XML schema;
loading the XML data as a memory mapped file;
parsing a portion of the XML data; and
validating the portion of the XML data according to the state machine.

22. A method as recited in claim 15, further comprising:
obtaining an XML schema that defines a configuration of the XML data;
generating a state machine that represents the XML schema;
loading the XML data as a memory mapped file;
validating a portion of the XML data according to the state machine; and
generating a reference to the portion of the XML data.

23. One or more computer-readable storage media comprising computer-executable instructions that, when executed, direct a computing device to perform the method of claim 15.

24. A method, comprising:
loading memory mapped XML data;
parsing the memory mapped XML data; and
validating the memory mapped XML data according to an XML schema.

25. A method as recited in claim 24, wherein validating includes validating the memory mapped XML data according to a state machine that represents the XML schema which defines a configuration of the memory mapped XML data.

26. A method as recited in claim 24, further comprising generating a state machine that represents the XML schema which defines a configuration of the memory mapped XML data, and wherein validating includes validating the memory mapped XML data according to the state machine.

27. A method as recited in claim 24, further comprising:
obtaining the XML schema that defines a configuration of the memory mapped XML data;
generating a state machine that represents the XML schema; and
wherein validating includes validating the memory mapped XML data according to the state machine.

28. One or more computer-readable storage media comprising computer-executable instructions that, when executed, direct a computing device to perform the method of claim 24.

29. One or more computer-readable storage media comprising computer executable instructions that, when executed, direct a computing device to:
memory map an application data file of application data;
maintain memory mapped regions of the application data;
generate a state machine that represents a schema defining a configuration of the application data; and
validate the application data according to the state machine.

30. One or more computer-readable storage media comprising computer executable instructions that, when executed, direct a computing device to generate a paging table of references that each reference a mapped region of the memory mapped application data.

31. One or more computer-readable storage media comprising computer executable instructions that, when executed, direct a computing device to:
memory map an XML data file of XML data;
maintain memory mapped regions of the XML data; and
validate the XML data.

32. One or more computer-readable storage media as recited in claim 31, further comprising computer executable instructions that, when executed, direct the computing device to generate a paging table of references that each reference a mapped region of the memory mapped XML data.

33. One or more computer-readable storage media as recited in claim 31, further comprising computer executable instructions that, when executed, direct the computing device to generate a state machine that represents an XML schema which defines a configuration of the XML data.

34. One or more computer-readable storage media as recited in claim 31, further comprising computer executable instructions that, when executed, direct the computing device to validate the XML data according to a state machine that represents an XML schema which defines a configuration of the XML data.

35. One or more computer-readable storage media as recited in claim 31, further comprising computer executable instructions that, when executed, direct the computing device to:
load the XML data as a memory mapped file; and
validate the XML data according to a state machine that represents an XML schema which defines a configuration of the XML data.

36. One or more computer-readable storage media as recited in claim 31, further comprising computer executable instructions that, when executed, direct the computing device to:
load the XML data as a memory mapped file;
parse the XML data; and
validate the XML data according to a state machine that represents an XML schema which defines a configuration of the XML data.

37. One or more computer-readable storage media as recited in claim 31, further comprising computer executable instructions that, when executed, direct the computing device to:
load the XML data as a memory mapped file;
validate a portion of the XML data; and
generate a reference to the portion of the XML data.

38. One or more computer-readable storage media as recited in claim 31, further comprising computer executable instructions that, when executed, direct the computing device to:
  obtain an XML schema that defines a configuration of the XML data;
  generate a state machine that represents the XML schema;
  load the XML data as a memory mapped file; and
  validate the XML data according to the state machine.

39. One or more computer-readable storage media as recited in claim 31, further comprising computer executable instructions that, when executed, direct the computing device to:
  obtain an XML schema that defines a configuration of the XML data;
  generate a state machine that represents the XML schema;
  loading the XML data as a memory mapped file;
  validate a portion of the XML data according to the state machine; and
  generate a reference to the portion of the XML data.

40. One or more computer-readable storage media as recited in claim 31, further comprising computer executable instructions that, when executed, direct the computing device to:
  obtain an XML schema that defines a configuration of the XML data;
  generate a state machine that represents the XML schema;
  load the XML data as a memory mapped file;
  parse a portion of the XML data; and
  validate the portion of the XML data according to the state machine.

41. A computing device, comprising:
  means for memory mapping an XML data file of XML data;
  means for maintaining memory mapped regions of the XML data;
  means for generating a state machine that represents an XML schema defining a configuration of the XML data; and
  means for validating the XML data according to the state machine.

42. A computing device as recited in claim 41, further comprising means for generating a paging table of references that each reference a mapped region of the memory mapped XML data.

43. A computing device as recited in claim 41, further comprising means for parsing the XML data.

44. A computing device, comprising:
  means for memory mapping an application data file of application data;
  means for maintaining memory mapped regions of the application data means for generating a state machine that represents a schema defining a configuration of the application data; and
  means for validating the application data.

45. A computing device as recited in claim 44, further comprising means for generating a paging table of references that each reference a mapped region of the memory mapped application data.

46. A computing device as recited in claim 44, further comprising means for generating a state machine that represents an XML schema which defines a configuration of the application data.

* * * * *